Nov. 7, 1961 W. L. MORRISON 3,007,597
INSULATING PORTABLE SHIPPER CONTAINER
Filed Aug. 18, 1958 4 Sheets-Sheet 4

INVENTORS
WILLARD L. MORRISON
BY PARKER & CARTER
ATTORNEYS

United States Patent Office

3,007,597
Patented Nov. 7, 1961

3,007,597
INSULATING PORTABLE SHIPPER CONTAINER
Willard L. Morrison, Lake Forest, Ill., assignor, by mesne assignments, to Liqufreeze Company, Inc., New York, N.Y., a corporation of New York
Filed Aug. 18, 1958, Ser. No. 755,792
1 Claim. (Cl. 220—11)

My invention relates to insulated portable shipper container and method of making it and has for one object to provide a container which may be used for the shipment of frozen food and the like.

Another object is to provide a container for frozen material wherein the necessary insulation is salable or usable after and independent of its insulation use.

Another object is to provide a portable container for frozen foods and the like wherein the insulation after it has served its purpose to insulate the foodstuffs has salable, commercial value.

Another object is to provide a shipper container wherein not only the frozen contents thereof but also the insulation has a value which more than justifies the cost of shipment of the assembled unit.

Other objects will appear from time to time throughout the specification and claim.

My container is especially well adapted to the shipment of foodstuffs wherein the foodstuffs are first frozen to usual warehouse temperatures, perhaps in the order of zero degree F. Thereafter the frozen foodstuff is packed in my insulating shipper container and by any suitable means, for example, pouring in liquid nitrogen or other non-deleterious cold boiling liquid at atmospheric pressure, the contents of the container is frozen far below zero to a temperature so low that the goods may be shipped to destination without further refrigeration.

The container includes a temporary and removable liquid tight inner liner, is rectangular, preferably cubical, and each of the side walls includes self-supporting pad or mattress of fibrous material, for example, raw wool compressed to a density such that the mattress together with reinforcing members on opposite sides is self-supporting and can be handled as a separate unit. For example, the wool may be compressed sufficiently to meet the needs for shipping purposes and the two supporting frames on the opposite sides of the mattress will be compressed and held together by means adequate to maintain such density and hold the supporting frames in parallelism spaced apart with the wool between them.

The wool forming each mattress will before the reinforcing frame members are applied, be wrapped in any well known, suitable, tough, water or moisture resistant wrapping usually laminated and reinforced so that the wool itself is completely protected against contact with the contents of the container on the inside and against contact with extrinsic material on the outside.

My container which will ultimately include six such mattresses, which may well be substantially identical, is first assembled by bringing together five of the mattresses generally edge to edge and preferably cubical to define an insulation member adequate to protect the frozen contents. This insulating member is formed about the removable liquid tight liner and the insulating member and the liquid tight liner are both open on the same face, the elements being held together by any suitable arrangement.

Frozen foodstuff is then packed into the liner and the open face of the member is closed by a sixth mattress which may be perforate or by a separate removable insulating cover. Thereafter a suitable quantity of liquid nitrogen or other cold boiling liquid, boiling far below zero at atmospheric pressure is, at atmospheric pressure, discharged into the removable liner evaporating on contact with the foodstuff to cool the foodstuff to the desired low point. The resultant gas may be wasted or reliquefied as the case may be and when the contents of the liner has reached the desired low point, nitrogen supply will be discontinued, the open face will be closed by the sixth mattress and thereafter the liner will be withdrawn through what was the bottom, the mattress at the bottom being temporarily removed for that purpose.

After such removal of the liner, the inner frames of the mattresses are by the compression applied through the wool packing from the outer frames or walls brought into and held in contact edge to edge with one another to provide a chamber which fits the frozen material. The outer frames are brought and held in edge to edge contact so that the container includes both an inner and an outer rectangular or cubical frame or wall, the frame or wall members being held in fixed relationship by tension applied to the outside thereof by straps or by compression and fastening means, such pressure being equal on all six faces and compressing the wool in each mattress to a selected insulating density and shipping rigidity.

The fastening means may be straps going around the box both vertically and horizontally and engaging each side of the box or container and holding them in place or the fastening means may take the form of interlocking members along the outer angular members of each pair of opposed mattresses.

As an example, the liner could well be a cube approximately 6 x 6 x 6 feet. The inner supporting frames for the mattresses could well be approximately six by six and the outer frames approximately eight by eight; thus the distance between the inner and outer walls of the container would provide space for one foot thickness of insulation. The outer dimensions of the package would be eight by eight by eight.

Delay and expense results from the removal of the liquid tight liner but in view of the very great importance of wasting none of the cold boiling or cooling liquid at the present time, it is preferred that an aluminum liner be used and great care must be taken to insure that this container will not leak under the very cold conditions to which it is exposed. Materials are under development which ultimately it is intended can be used in place of the aluminum liner. Under those circumstances the liner itself can be disposable.

As above indicated, when the mattress is first formed, its contents is compressed to such a density that it furnishes adequate insulation and shipping rigidity and has adequate strength and such compression is maintained by the tension members joining the inner and outer reinforcing frames or walls. When the mattresses are assembled to form the container and the container walls are forced together either by the use of outside pressure or by tension on the strapping about the container and the wool is further compressed, all that happens is that the tension on the tension members is relieved and the mattresses are compressed inwardly toward the rectangular frozen contents, thus providing a rigid, easily handleable, durable package.

When the package of frozen food reaches destination all that is necessary is to release the holding means or cut the straps which may for example be of Signode steel strapping. This allows the mattresses to expand back to their initial compressed density, when each mattress may be separately removed and send to the point where wool is needed, the only waste at this point being the waterproofing material and the straps or perhaps the holding means.

When the wool reaches its destination, the reinforcing framework is removed and may be reclaimed and the wool used in the usual way. In the meantime, the frozen food once the insulation has been removed, may be placed in frozen storage in the usual way.

While the wool under compression is associated with two parallel reinforcing framework or reinforcing elements, the space between the outer peripheries of the two reinforcing elements is not reinforced. The wool is covered at that point merely by the wrapper and bulges outwardly under pressure as indicated in a convex contour but when opposed edges of the mattresses are brought together and pressure is applied to bring the inner and outer framework members into snug contact and the density of the mattress is increased by reducing the clearance between the inner and outer frames, substantial pressure is applied to the wool in the areas where the edges of adjacent mattresses meet. This results in providing a tight fit between the edges of adjacent mattresses. Under some circumstances, it will be sufficient to use just the same type of wrapper as is used on the other portions of the mattresses. Under other circumstances, special reinforcing wrapper may be used at that point but in any event the wrapper must have this characteristic, namely that it, like certain paper or cloth, does not deteriorate, become brittle or lose strength in the presence of very low temperatures.

My invention is illustrated more or less diagrammatically in the accompanying drawings, wherein.

Like parts are indicated by like characters throughout the specification and drawings.

Figure 1:
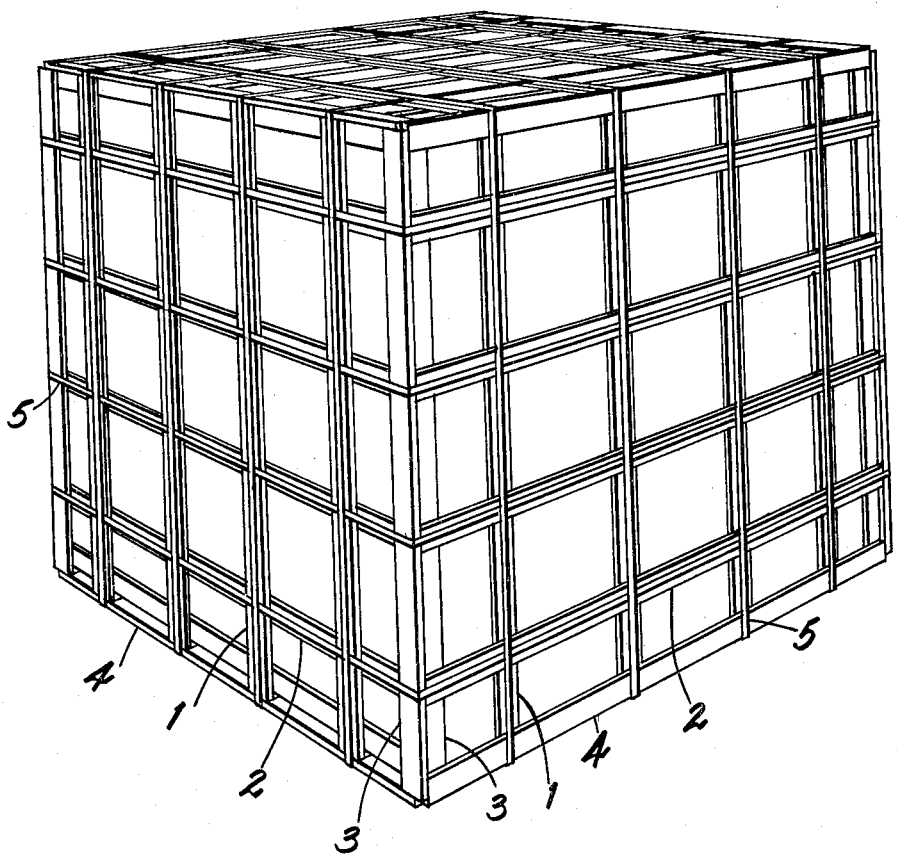
FIGURE 1 is a perspective of my container ready for shipment.

My insulating shipper container includes as shown in FIGURE 1 a six sided rectangular body, preferably but not essentially cubical. Each side is reinforced by an exterior rigid, reinforcing frame which comprises a plurality of vertical members 1 intersected by a plurality of horizontally cross members 2. Each frame is bounded on its exterior by vertical corner members 3 and horizontal corner members 4. These frames are held edge to edge by strapping 5. The straps extend both vertically and horizontally so that the straps hold each of the frames in edge to edge contact with the frames surrounding it. This is the appearance of the container after it has been packed and prepared for shipment and before it is opened for disposal of the contents and shows all that is visible during transit and storage.

Figure 2:
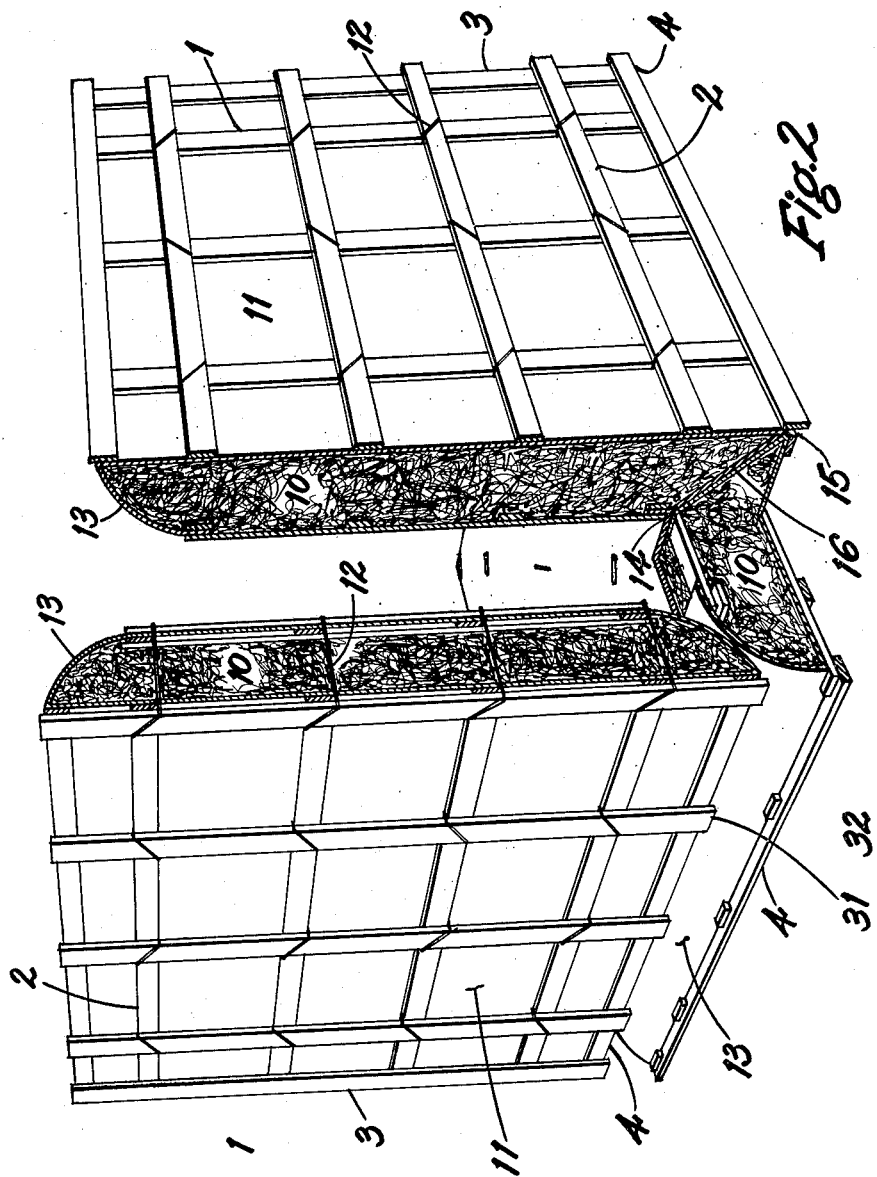
FIGURE 2 is a perspective on a larger scale with parts in section through a corner of the container.
Figure 3:
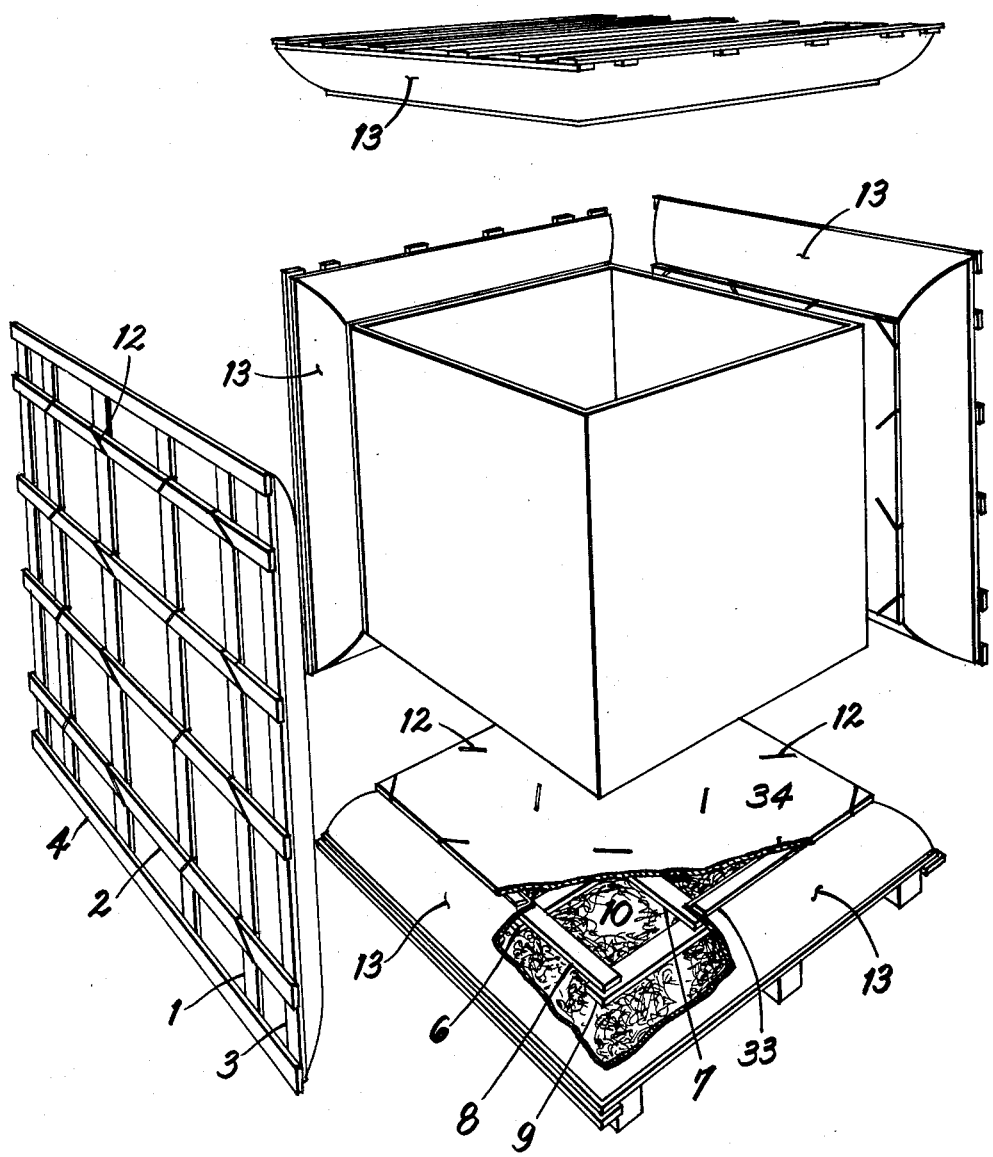
FIGURE 3 is an exploded view of the container assembly.

FIGURES 2 and 3 illustrate construction and assembly of the container. Each side of the container comprises a separate, self-supporting, reinforced mattress, there being six of them preferably similar if not identical, and preferably square so that a cubic box results from their assembly.

Each mattress includes the outer frame made up of the members 1, 2, 3 and 4 above referred to and an inner frame made up of shorter horizontal and vertical cross members and corner members 6, 7, 8 and 9. The inner frame is parallel with the outer frame. The two frames are spaced apart and the inner frame is as indicated, smaller than the outer. For example, the distance between the two parallel frames could be in the order of twelve inches. The outer frame could be in the order of eight by eight and the inner frame six by six.

Between these two frames is a batt of fibrous material, preferably raw wool 10. This batt is wrapped in any suitable waterproof tear resistant wrapping material, wrapping material of the type well known on the market, 11, between the inner and outer frames and the wool. The wool is held under compression by tension members 12 extending through the body of the wool and joining the inner and outer frames and holding the two frames in parallelism.

Since the inner frame is substantially smaller than the outer frame, there is a corner area where the wool batt extends out beyond the inner frame to the outer periphery of the outer frame. In that area the wrapper 13 being of substantial strength, constrains the edge of the wool batt to a convex contour, and is preferably of such strength so as to insure that when the wool is compressed to form the batt, it will not burst out at the edges.

FIGURE 2 which omits the liner and the load in the interest of clarity shows that the peripheral edges of the inner frame of the bottom mattresses are contacted by the lower edges of each of the four side mattresses as at 14. The outer edges of the bottom frame of the bottom mattresses are contacted by the lower edges of the outer frames of the side mattresses as at 15. The convex bulges of the wool in the adjacent side and bottom mattresses come together along a forty-five degree line as indicated at 16 making a generally air tight joint or at least air circulation resistant joint. On the left hand side of FIGURE 2, the side mattress is lifted away from contact with the bottom mattress to illustrate the difference between the two bulging mattress edges before they are brought into contact with the result when they are brought into contact with one another. The same compression situation occurs with respect to each of the twelve mating areas between the various mattresses.

The particular dimensions above referred to are purely illustrative. The point is that assuming that the inner frames of the various mattresses are in engagement a rectangular box results but the wool in the mattresses being subject only to the initial compression are wider than the twelve inches suggested so the outer edges of the outer frame will be out of contact but when the wool is compressed and the frames are brought down to the desired spacing, the edges of the outer frames also are in contact and the beam effect of each frame is by the compression of the wool enhanced so that each mattress is a separate, self-supporting structural member united by tying straps in a rigid, rectangular structure.

FIGURE 3 illustrates the various elements of the container and adds to FIGURE 2 the removable liquid tight member which protects the mattress members from the liquid during the time that the liquid is boiling in contact with the food. This liner is preferably of aluminum with welded flap edges because it is of the utmost importance that none of the liquid or gaseous nitrogen be wasted.

Figure 4:
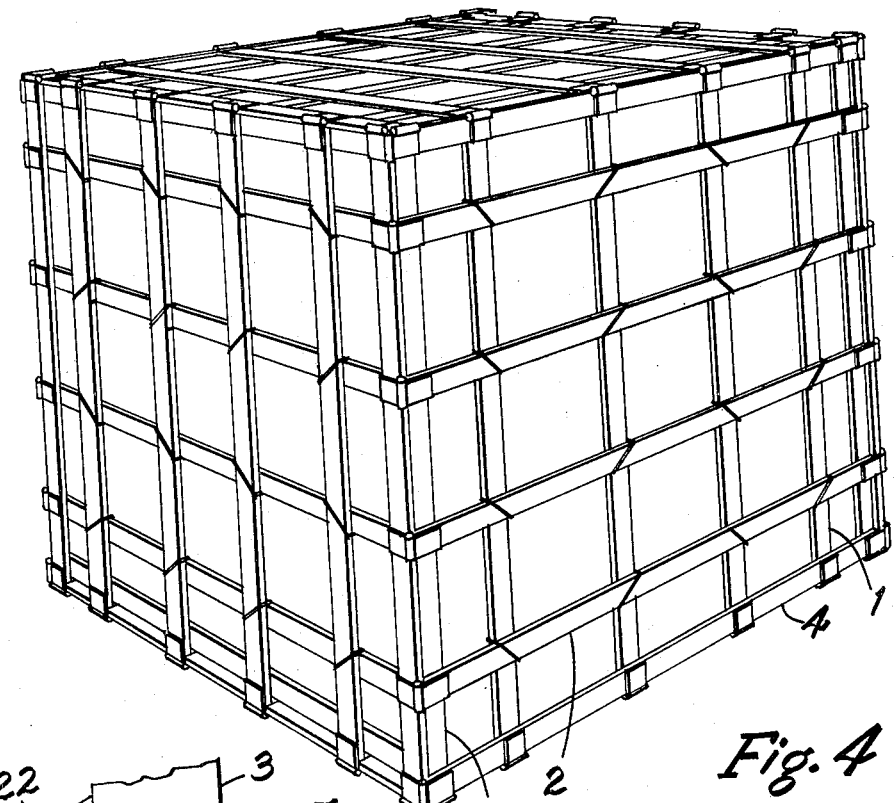
FIGURE 4 is a perspective similar to FIGURE 1 showing a modified form of container.
Figure 5:
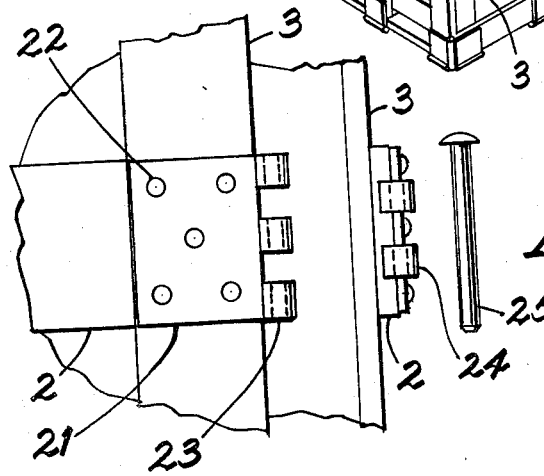
FIGURE 5 is a detail of the special type of fastening means used in FIGURE 4.

In the modified form shown in FIGURES 4 and 5, the mattress instead of being held together by strapping all around the box are held together by hinge members 21 which may be bolted or riveted to the ends of the slats which define the outer wall of the panel or mattress, the bolt or rivet members being shown at 22. The hinge members have mating loops 23, 24 through which the pins 25 may be thrust to lock them together so that in this case, each slat serves as a tension member as well as a structural wall member. All that is necessary is to force the walls together to bring the box to the desired size when the pins may be inserted to hold the panels together.

If desired, the hinge members may be removed by unbolting from the slats if it is desired to dispose of the slats for separate return or the slat hinge members defining the walls may be returned to destination.

Since the wool is a commodity of substantial value, it must be protected in shipment and so the tear-proof, waterproof wrapper is wrapped around the wool before the batts are formed. This waterproof, tear-proof wrapper, however, has an additional purpose. Because the container will be filled with very cold frozen material, it is highly desirable to avoid air circulation, convection currents, etc., in the wool and the wool fibers bring that about to a very substantial extent. Nevertheless there is always the possibility that there may be some air circulation within the insulating wool batt and it is important that such air circulation be reduced to a minimum and that ambient air be not allowed to enter. The paper or wrapper used therefore is preferably also one of the well known materials which serve as a vapor barrier so that entrance of ambient moisture laden air to and circulation through the wool batt will be inhibited.

When the mattresses are assembled edge to edge and held together by the strapping, the slats which build up the rigid frame are at their ends in register and if desired, may be arranged as shown in FIGURE 2 where the vertical slat on the mattress used for the side extends as at 31 below the bottom transverse slat on the bottom mattress in the space indicated at 32. This is one convenient way of providing an interlock though the essential thing is that the slats on adjacent edge engaged mattresses abut in one way or another against one another so that the pressure applied by the straps holds the package permanently in place.

On the inner face of each mattress is a sealing strip 33 masking the edge of the waterproof paper-like wrapper 13 and sealing it to a Kraveneer or other relatively stiff sheet 34 which masks the slats of inner reinforcing member and overlies the edges of wrapper 13 and sealing strip 33, thus providing a smooth surface for the inner face of the batt, protecting the wrappers of the foodstuffs from contact with the rough reinforcing structure. This provides a smooth inner wall lining integral with the batts though of course the lining may be separate and take the form of a separate box.

I claim:

An insulating container comprising a six-sided box, each side comprising a self-sustaining panel including inner and outer parallel, rigid, frame members of the same shape, the inner frame being smaller than the outer, each frame comprising a plurality of spaced, intersecting horizontal and vertical slats, a mattress of fibrous material filling the space between the frames, a water and vapor resistant flexible tearproof wrapper completely enclosing the mattress, flexible tie cords wound around the intersections of the frame members, passing through the mattress and the wrapper, holding the mattress under compression between the frames and biasing the outer mattress edges between the frame members toward an outwardly convex contour, removable means in contact with the outer frame members only for holding them in edge to edge contact the relative dimensions of inner and outer frame members being such that when all frame members are held in edge to edge contact by the removable holding means the tension on the tie cords is reduced.

References Cited in the file of this patent

UNITED STATES PATENTS

| | | |
|---|---|---|
| 1,303,751 | Wilson | May 13, 1919 |
| 1,445,553 | Poschadel | Feb. 13, 1923 |
| 2,331,585 | Walker | Oct. 12, 1943 |
| 2,498,016 | Stine et al. | Feb. 21, 1950 |
| 2,507,379 | Morrison | May 9, 1950 |
| 2,540,331 | Hlavaty | Feb. 6, 1951 |
| 2,635,251 | Silvestri | Apr. 21, 1953 |